United States Patent Office 2,940,671
Patented June 14, 1960

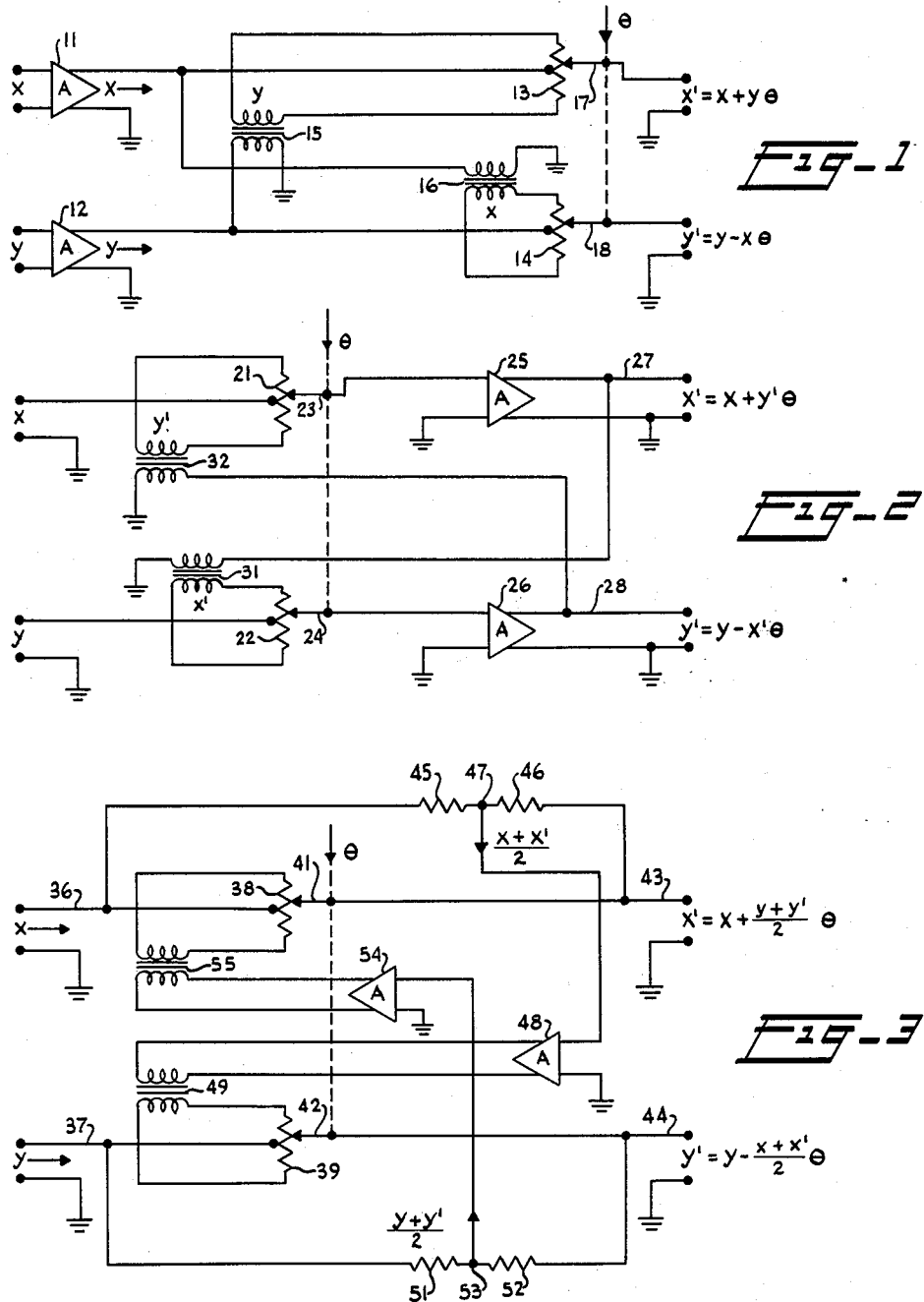

2,940,671

RECTANGULAR CO-ORDINATE ROTATOR

John W. Gray, Pleasantville, N.Y., assignor to General Precision, Inc., a corporation of Delaware Filed Mar. 2, 1955, Ser. No. 491,619

13 Claims. (Cl. 235—189)

This invention relates generally to analog computing apparatus and particularly to apparatus for computing the co-ordinates of a point with respect to axes which have been rotated with respect to the axes of the known co-ordinates.

The need for apparatus for rotating rectangular co-ordinates may arise in connection with tactical aerial navigation. An observer in an aircraft at point A may know his position with respect to a reference point B in terms of rectangular co-ordinates the origin of which is at point A and one of the axes of which lies along the meridian of point A. He may wish to know his position in terms of the north-south and east-west distances from B to A. These distances are equivalent to the co-ordinates of point B in terms of rectangular co-ordinates having their origin at A and one of whose axes is parallel to the meridian at B. The meridians at two points such as A and B are not, in general, parallel, so that the computation of the desired distances involves a rotation of the co-ordinates axes through an angle $\theta$. If points A and B are within a few hundred miles of each other and between the arctic and antarctic circles, $\theta$ will be a small angle.

The situation outlined briefly above is merely illustrative of the practical problems encountered which may be solved by the aid of the present invention.

If $x$ and $y$ are the co-ordinates of a point in a rectangular co-ordinate system then, relative to a system which is rotated through an angle $\theta$ from the original system, the co-ordinates $x'$, $y'$ of the same point are:

$$x' = x \cos \theta + y \sin \theta \qquad (1)$$
$$y' = y \cos \theta - x \sin \theta \qquad (2)$$

An analog computer for solving the above equations can readily be devised. The two mutually perpendicular rotor windings of an inductive resolver may be energized by voltage proportional to $x$ and $y$ respectively and the rotor adjusted to the angle $\theta$. The two mutually perpendicular stator windings will then yield voltages proportional to $x'$ and $y'$ respectively.

However, such a computer is expensive because of the high cost of accurate inductive resolvers. Additionally, the output voltages $x'$ and $y'$ are derived from a resultant flux produced by the two rotor windings, so that when $\theta$ is equal to zero the outputs, $x'$ and $y'$, may not be precisely equal to the inputs, $x$ and $y$. In other words, an instrumental error may remain even when $\theta$ is equal to zero.

An analog computer similar to that described above could also be constructed using sine and cosine potentiometers, but would also be expensive due to the high cost of accurate potentiometers.

It is an object of this invention to provide an analog computing apparatus for rotating rectangular co-ordinate axes through a small angle, which apparatus will be both inexpensive and accurate.

Another object of this invention is to provide apparatus for rotating co-ordinate axes which has no instrumental error when the angle of rotation is zero.

Another object of the invention is to provide apparatus which will convert data representing the rectangular co-ordinates of a point with respect to a first pair of co-ordinates axes to data representing the rectangular co-ordinates of the same point with respect to a second set of co-ordinate axes having the same origin but rotated with respect to the first set.

In accordance with one embodiment of the invention, the approximate equations $$x' = x + \frac{y+y'}{2}\theta$$

$$y' = y - \frac{x+x'}{2}\theta$$

are solved. A voltage proportional to $x$ is applied to the center tap of a linear potentiometer while a voltage proportional to $$\frac{y+y'}{2}$$

is applied across the potentiometer. The slider of the potentiometer is mechanically displaced a distance from the center tap proportional to the angle $\theta$, thus multiplying $$\frac{y+y'}{2}$$

by $\theta$. The slider is therefore at a potential proportional to $$x + \frac{y+y'}{2}\theta$$

A similar arrangement is used to obtain $$y' = y - \frac{x+x'}{2}\theta$$

For a clearer understanding of the invention, reference may be made to the following detailed description and the accompanying drawing, in which:

Figure 1 is a diagram of one form of an analog co-ordinate rotator;

Figure 2 is a diagram of another form of co-ordinate rotator;

Figure 3 is a diagram of yet another form of co-ordinate rotator; and

Figure 4:
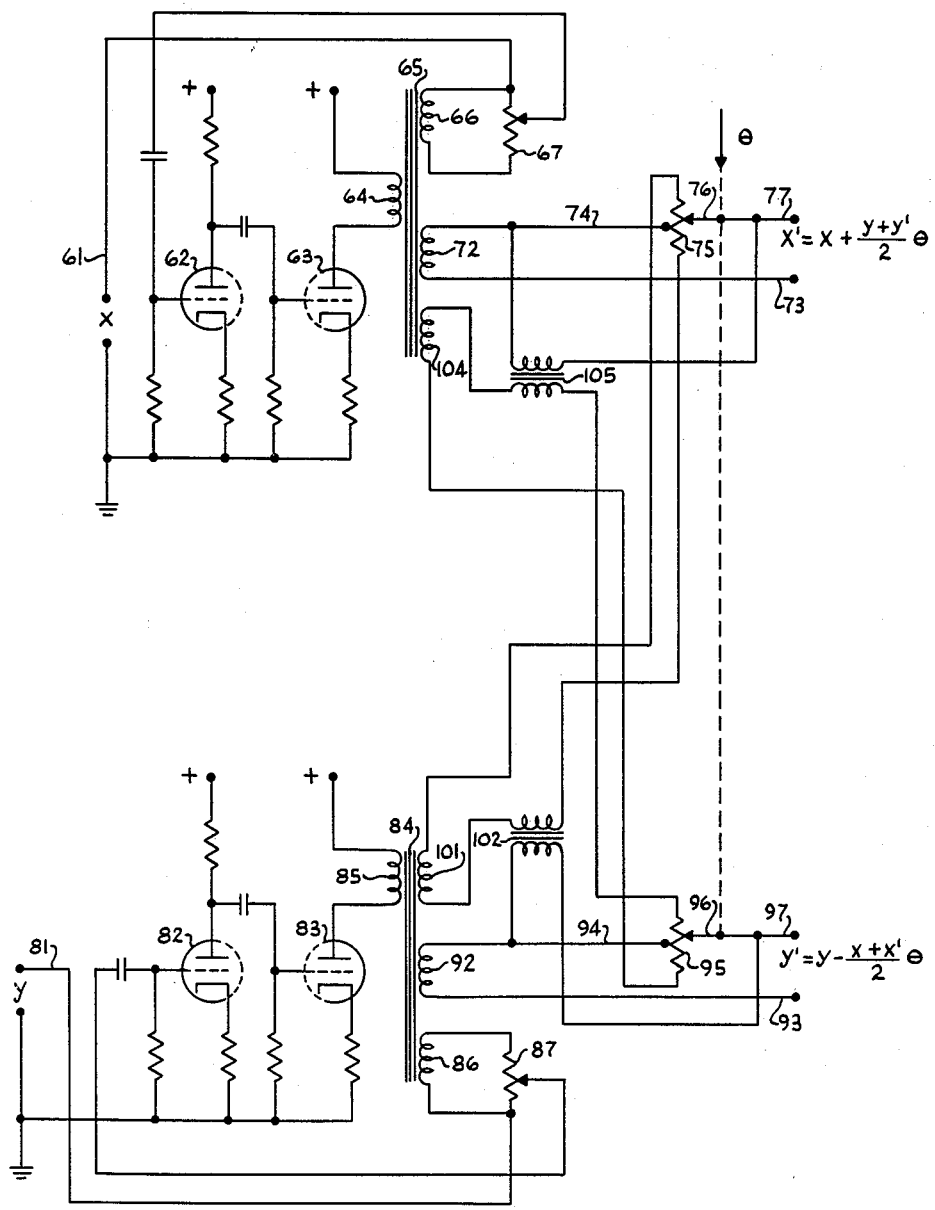
Figure 4 is a diagram of a co-ordinate rotator similar to that of Fig. 3.

If the angle through which the co-ordinate axes are to be rotated is small, the general equations for the new co-ordinates can be modified as follows:

$$x' = x + y\theta \qquad (3)$$
$$y' = y - x\theta \qquad (4)$$

Apparatus for solving these equations is shown in Fig. 1. Alternating voltages proportional to the known co-ordinates, $x$ and $y$, are applied through isolating amplifiers 11 and 12 respectively to the midpoints of linear potentiometers 13 and 14 respectively. The potentiometer 13 has a voltage proportional to $y$ impressed across its extremities, which voltage is obtained from the secondary of a transformer 15, the primary of which is connected to the output of amplifier 12. Similarly, a transformer 16 is employed to impress a voltage proportional to $x$ across the extremities of the potentiometer 14. The sliders 17 and 18 of the potentiometers 13 and 14 are mechanically connected together and adjusted according to the angle θ, the median position corresponding to θ=zero. The outputs, x' and y', are taken from the sliders 17 and 18 respectively.

It can be seen from the drawing that the output voltage x' is equal to the input voltage x modified by the voltage drop across that portion of potentiometer 13 between its midpoint and the slider 17. This voltage drop is, of course, proportional to yθ. Similarly, the output voltage y' is equal to the input voltage y modified by a similar drop in potentiometer 14 proportional to xθ. The phases of the voltages at transformers 15 and 16 are selected so that, for positive values of θ, the modifying voltage on potentiometer 13 is additive, while that on potentiometer 14 is subtractive.

For small values of θ, another modification of the general equations can be made as follows:

$$x' = x + y'\theta \qquad (5)$$
$$y' = y - x'\theta \qquad (6)$$

Apparatus for solving these equations is shown in Fig. 2. Input voltages proportional to x and y are applied to center taps of linear potentiometers 21 and 22 respectively. The sliders 23 and 24 are mechanically joined and adjusted in unison in accordance with the angle θ. Voltages from the sliders 23 and 24 are passed through isolating amplifiers 25 and 26 respectively to the x' and y' output conductors 27 and 28 respectively. The output conductor 27 is also connected to the primary winding of a transformer 31 the secondary of which is connected across the potentiometer 22. Similarly, the output conductor 28 is connected to the primary of a transformer 32 the secondary of which is connected across the potentiometer 21. This apparatus operates in much the same way as that of Fig. 1. The potential of slider 23 is that of the input, x, plus that of the output conductor 28 multiplied by the angle θ, while the potential of slider 24 is that of the input, y, less that of the output conductor 27 multiplied by the angle θ. The output potentials on conductors 27 and 28 are proportional to the potentials of sliders 23 and 24 respectively. The arrangement of Fig. 2 has the advantage, over that of Fig. 1, that the outputs of amplifiers 25 and 26 are directly available to drive any load connected to the output conductors.

It is obvious that the Equations 3 and 4 and also the Equations 5 and 6 are but approximations. Mathematical analysis shows that the errors introduced by using either set in place of the exact Equations 1 and 2 are of approximately the same magnitude (about .15% when θ=3°) but of opposite sign. It would appear that, if the equations were altered so as to make the second term in each the average of the values specified by Equations 3 and 4 and Equations 5 and 6, the errors would be substantially reduced, and this is, indeed, the case. The equations then become $$x' = x + \frac{y + y'}{2}\theta \qquad (7)$$

$$y' = y - \frac{x + x'}{2}\theta \qquad (8)$$

and the error is reduced to approximately .001% when θ=3°.

Figure 3 illustrates one example of apparatus for solving Equations 7 and 8. Alternating voltages proportional to x and y are applied to input conductors 36 and 37 respectively which are in turn connected to the center tap of linear potentiometers 38 and 39 respectively. The sliders 41 and 42 of the potentiometers are varied in accordance with θ and connected to output conductors 43 and 44 respectively. Two equal resistors 45 and 46 are serially connected between input conductor 36 and output conductor 43 so that the potential of their junction 47 is the average of the potentials of the input and output conductors, or $$\frac{x + x'}{2}$$

The potential of junction 47 is passed through an isolating amplifier 48 to the primary of a transfer 49, the secondary of which is connected across the potentiometer 39. In a similar fashion, equal resistors 51 and 52 are serially connected between conductors 37 and 44, and the potential of their junction 53 is passed through an isolating amplifier 54 to the primary of a transformer 55 the secondary of which is connected across the potentiometer 38.

The operation of the apparatus of Fig. 3 is much like that of Figs. 1 and 2 and need not be further described. It should be understood, however, that the gain of the amplifiers and the turns ratio of the transformers must be properly selected, giving due consideration to the maximum value of θ for which the apparatus is designed. For example, suppose the gain of amplifiers 48 and 54 is unity, and the turns ratio of transformer 49 and 55 is 4:1. Then the voltage across the potentiometer 38 will be $$\frac{1}{4}\frac{y + y'}{2}$$

and the voltage drop from the center tap to one end will be $$\frac{1}{8}\frac{y + y'}{2}$$

When the slider 41 is at one extremity, the voltage added to x will be $$\frac{1}{8}\frac{y + y'}{2}$$

which corresponds to an agle θ of one-eighth radian. Thus such an arrangement is suitable for rotating coordinates through angles of ±⅛ radian.

The amplifiers need not be highly linear because the portion of the output voltage affected by the amplifier is a small, correcting portion. Furthermore, when θ=0 the sliders 41 and 42 make contact with the input conductors 36 and 37 so that the amplifiers have no effect on the output.

Fig. 4 illustrates a specific apparatus in accordance with the foregoing principles suitable for rotating co-ordinates through angles from zero to plus or minus ⅛ of a radian. An alternating voltage proportionate to x is applied through an input conductor 61 to an amplifier which comprises triode sections 62 and 63. The output of the amplifier is obtained through the primary winding 64 of a transformer 65 in series with the anode of triode 63. A secondary winding 66 provides an output voltage which is placed in series opposing to the input. The potentiometer 67 is connected across the winding 66 so that the amount of negative feedback and therefore the gain of the amplifier and the scale factor of the transformation may be adjusted. The principal output is taken from a secondary winding 72, one terminal of which is connected to the output conductor 73 and the other terminal of which is connected by means of a conductor 74 to the midpoint of a linear potentiometer 75. The slider 76 of the potentiometer is varied in accordance with the angle θ and is connected to the other ouput conductor 77.

In a similar fashion a voltage proportional to y is connected by means of an input conductor 81 to an amplifier which comprises two triode sections 82 and 83. The output of the amplifier is obtained from a transformer 84 the primary winding 85 of which is in series with the anode of triode 83. Negative feedback is obtained from a secondary winding 86 which has a potentiometer 87 connected across it so that the gain of the amplifier may be adjusted. Another secondary winding 92 of transformer 84 has one terminal connected to the output conductor 93 while the other terminal is connected through another conductor 94 to the center tap of a linear potentiometer 95 the slider 96 of which is mechanically connected to the slider 76 and which is electrically connected to the output conductor 97.

The output potential appearing on the $x'$ conductor 77 is equal to that on the conductor 74 modified by the potential existing between the center tap of potentiometer 75 and the slider 76. The apparatus is designed for a maximum angle $\theta$ of $\frac{1}{16}$ of a radian so that the voltage drop between the center tap and one extremity should be proportional to $$\frac{1}{16} \frac{y+y'}{2}$$

To obtain this voltage, the secondary winding 101 of transformer 84 is provided with the proper number of turns to yield a voltage $\frac{1}{8}$ that of winding 92, or $\frac{1}{8}y$. A transformer 102 has its primary connected between conductors 94 and 97 so that it is excited by a voltage equal to $y'-y$. Transformer 102 has a turns ratio of 16:1 so that the voltage at the secondary of transformer 102 is equal to $$\frac{1}{8} \frac{y'-y}{2}$$

This voltage is added to that of winding 101 so that the resulting voltage applied to potentiometer 75 is $$\frac{1}{8} \frac{y+y'}{2}$$

Therefore the drop between the center tap and the end of potentiometer 75 is one-half of this value or $$\frac{1}{16} \frac{y+y'}{2}$$

which corresponds to an angle $\theta$ equal to $\frac{1}{16}$ radian.

The voltage applied to potentiometer 95 is obtained in a similar fashion. A secondary winding 104 on transformer 65 has $\frac{1}{8}$ the number of turns of winding 72 so as to provide a voltage equal to $\frac{1}{8} x$. A transformer 105 has its primary connected between conductors 74 and 77 and has a turns ratio of 16:1. The secondary voltage, which is equal to $$\frac{1}{8} \frac{x'-x}{2}$$

is added to the voltage of winding 104 and the resulting voltage, $$\frac{1}{8} \frac{x+x'}{2}$$

is applied to potentiometer 95. The phase of this voltage is selected so that when the slider 96 is displaced in a direction corresponding to positive values of $\theta$, this voltage is subtracted from the voltage of conductor 94 so that the output on conductors 97 and 93 is $$y' = y - \frac{x+x'}{2}\theta$$

It can be seen that the apparatus of Fig. 4 has a number of advantageous features. The amplifiers, with their high series negative feedback, impose virtually no load on the input circuits. The potentiometers 67 and 87 allow the scale factor, that is, the ratio between the voltage at secondary winding 72 at that on input conductor 61, to be changed to suit varied conditions. Inexpensive components can be used since no expensive inductive resolvers or sine-cosine potentiometers are required. The neutral (ground) conductor of each output is isolated both from that of the other output and from that of the input. This is a highly desirable feature, because the outputs may be utilized by different units and chassis or ground potential differences of several millivolts may exist between units.

It should be noticed that the apparatus described in connection with each figure of the drawing has a common feature. In each case the desired co-ordinate is obtained by adding a correction to the corresponding given co-ordinate. In mathematical terms, $$x' = x+u$$
$$y' = y+v$$

In Fig. 1, $u=y\theta$, $v=-x\theta$; in Fig. 2, $u=y'\theta$, $v=-x'\theta$; in Figs. 3 and 4, $$u = \frac{y+y'}{2}\theta, \quad v = -\frac{x+x'}{2}\theta$$

This feature is an important reason why a simple and accurate instrumentation can be devised.

It is to be understood that the particular values of angular rotation and turns ratios discussed are illustrative only, and that these values may be changed to suit particular applications. Many other modifications will occur to those skilled in the art.

What is claimed is:

1. Apparatus for deriving two output voltages proportional to the rectangular co-ordinates of a point referred to axes rotated with respect to the axes of the two known co-ordinates comprising, first and second potentiometers each having a slider and a center tap, means for impressing a first input voltage proportional to one known co-ordinate onto the center tap of said first potentiometer, means for impressing a second input voltage proportional to the other known co-ordinate onto the center tap of said second potentiometer, means for moving the sliders of said potentiometers in unison in accordance with the angle of rotation between the sets of co-ordinate axes, means for applying across the extremities of said first potentiometer a voltage proportional to the average of that of the center tap and slider of said second potentiometer, and means for applying across the extremities of said second potentiometer a voltage proportional to the average of that of the center tap and slider of said first potentiometer, whereby the sliders of said potentiometers bear the desired output voltages.

2. Apparatus for deriving two output voltages proportional to the rectangular co-ordinates of a point referred to axes rotated with respect to the axes of the two known co-ordinates comprising, first and second potentiometers each having a slider and a center tap, means for impressing a first input voltage proportional to one known co-ordinate onto the center tap of said first potentiometer, means for impressing a second input voltage proportional to the other known co-ordinate onto the center tap of said second potentiometer, means for moving the sliders of said potentiometers in unison in accordance with the angle of rotation between the sets of co-ordinate axes, a conductor bearing a first output voltage connected to the slider of said first potentiometer, a conductor bearing a second output voltage connected to the slider of said second potentiometer, means for applying across the extremities of said first potentiometer a voltage proportional to the average of said second input voltage and said second output voltage, and means for applying across the extremities of said second potentiometer a voltage proportional to the average of said first input voltage and said first output voltage.

3. Apparatus according to claim 2 in which the voltage applied to the extremities of said first potentiometer is derived from the junction of serially connected equal resistors connected between the center tap and the slider of said second potentiometer.

4. Apparatus according to claim 3 in which the voltage applied to the extremities of said second potentiometer is derived from the junction of serially connected equal resistors connected between the center tap and the slider of said first potentiometer.

5. Apparatus according to claim 2 in which the voltage applied to the extremities of said first potentiometer is the sum of a voltage proportional to said second input voltage and a voltage proportional to the difference between said second output voltage and said second input voltage.

6. Apparatus according to claim 5 in which the voltage applied to the extremities of said second potentiometer is the sum of a voltage proportional to said first input voltage and a voltage proportional to the difference between said first output voltage and said first input voltage.

7. Apparatus for accepting first and second voltages proportional to a first set of rectangular co-ordinates of a point and for deriving therefrom third and fourth voltages proportional to a second set of rectangular co-ordinates of the same point, the axes of said second set of co-ordinates being rotated with respect to the axes of said first set, comprising, first and second pairs of output conductors, said first pair for said third voltage and said second pair for said fourth voltage, first and second linear potentiometers each having a center tap and an adjustable arm, means for applying said first voltage between the center tap of said first potentiometer and one conductor of said first pair, means for applying said second voltage between the center tap of said second potentiometer and one conductor of said second pair, means for connecting the arm of said first potentiometer to the other conductor of said first pair, means for connecting the arm of said second potentiometer to the other conductor of said second pair, means for displacing the adjustable arms of each potentiometer from the center taps a distance proportional to the angle of rotation between the axes of the sets of co-ordinates, means for applying a voltage proportional to the average of said second and fourth voltages across said first potentiometer and means for applying a voltage proportional to the average of said first and third voltages across said second potentiometer.

8. Apparatus for accepting first and second voltages proportional to a first set of rectangular co-ordinates of a point and for deriving therefrom third and fourth voltages proportional to a second set of rectangular co-ordinates of the same point, the axes of said second set of co-ordinates being rotated with respect to the axes of said first set, comprising, first and second pairs of output conductors, said first pair for said third voltage and said second pair for said fourth voltage, first and second linear potentiometers each having a center tap and an adjustable arm, means for applying said first voltage between the center tap of said first potentiometer and one conductor of said first pair, means for applying said second voltage between the center tap of said second potentiometer and one conductor of said second pair, means for connecting the arm of said first potentiometer to the other conductor of said first pair, means for connecting the arm of said second potentiometer to the other conductor of said second pair, means for displacing the adjustable arms of each potentiometer from the center taps a distance proportional to the angle of rotation between the axes of the sets of co-ordinates, a first pair of resistors connected in series between the center tap and the arm of said first potentiometer, means for applying a voltage proportional to the potential of the junction of said first pair of resistors across the extremities of said second potentiometer, a second pair of resistors connected in series between the center tap and the arm of said second potentiometer, and means for applying a voltage proportional to the potential of the junction of said second pair of resistors across the extremities of said first potentiometer.

9. Apparatus for accepting first and second voltages proportional to a first set of rectangular co-ordinates of a point and for deriving therefrom third and fourth voltages proportional to a second set of rectangular co-ordinates of the same point, the axes of said second set of co-ordinates being rotated with respect to the axes of said first set, comprising, first and second pairs of output conductors, said first pair for said third voltage and said second pair for said fourth voltage, first and second linear potentiometers each having a center tap and an adjustable arm, means for applying said first voltage between the center tap of said first potentiometer and one conductor of said first pair, means for applying said second voltage between the center tap of said second potentiometer and one conductor of said second pair, means for connecting the arm of said first potentiometer to the other conductor of said first pair, means for connecting the arm of said second potentiometer to the other conductor of said second pair, means for displacing the adjustable arms of each potentiometer from the center taps a distance proportional to the angle of rotation between the axes of the sets of co-ordinates, means for deriving a fifth voltage proportional to said first voltage, means for deriving a sixth voltage proportional to the difference between said third and first voltages, means for adding said fifth and sixth voltage and applying the resulting voltage across said second potentiometer, means for deriving a seventh voltage proportional to said second voltage, means for deriving an eighth volatge proportional to the difference between said fourth and second voltages, and means for adding said seventh and eighth voltages and applying their sum across said first potentiometer.

10. Analog means for solving the equations $$x' = x = \frac{y+y'}{2}\theta$$

$$y' = y - \frac{x+x'}{2}\theta$$

where $x$, $y$ and $\theta$ are known quantities and $x'$ and $y'$ are unknowns for which a solution is to be obtained comprising, a first pair of output conductors for delivering a voltage proportional to $x'$, a second pair of output conductors for delivering a voltage proportional to $y'$, first and second linear potentiometers each having a center tap and a movable arm, means for displacing the arms of each potentiometer a distance from its center tap proportional to the angle $\theta$, means for connecting the arm of the first potentiometer to one conductor of said first pair, means for connecting the arm of the second potentiometer to one conductor of said second pair, means for applying a voltage proportional to $x$ between the center tap of said first potentiometer and the other conductor of said first pair, means for applying a voltage proportional to $y$ between the center tap of said second potentiometer and the other conductor of said second pair, means for applying a voltage proportional to $y+y'$ across the extremities of said first potentiometer, and means for applying a voltage proportional to $x+x'$ across the extremities of said second potentiometer.

11. Analog means for solving the equations $$x' = x + \frac{y+y'}{2}\theta$$

$$y' = y - \frac{x+x'}{2}\theta$$

where $x$, $y$ and $\theta$ are known quantities and $x'$ and $y'$ are unknowns for which a solution is to be obtained comprising, a first pair of output conductors for delivering a voltage proportional to $x'$, a second pair of output conductors for delivering a voltage proportional to $y'$, first and second linear potentiometers each having a center tap and a movable arm, means for displacing the arms of each potentiometer a distance from its center tap proportional to the angle $\theta$, means for connecting the arm of the first potentiometer to one conductor of said first pair, means for connecting the arm of the second potentiometer to one conductor of said second pair, means for applying a voltage proportional to $x$ between the center tap of said first potentiometer and the other conductor of said first pair, means for applying a voltage proportional to $y$ between the center tap of said second potentiometer and the other conductor of said second pair, a first pair of resistors connected in series between the center tap and the arm of said first potentiometer, means for applying a voltage proportional to the potential of the junction of said first pair of resistors across said second potentiometer, a second pair of resistors connected in series between the center tap and the arm of said second potentiometer, and means for applying a voltage proportional to the potential of the junction of said second pair of resistors across said first potentiometer.

12. Analog means for solving the equations $$x' = x + \frac{y+y'}{2}\theta$$

$$y' = y - \frac{x+x'}{2}\theta$$

where $x$, $y$ and $\theta$ are known quantities and $x'$ and $y'$ are unknowns for which a solution is to be obtained comprising, a first pair of output conductors for delivering a voltage proportional to $x'$, a second pair of output conductors for delivering a voltage proportional to $y'$, first and second linear potentiometers each having a center tap and a movable arm, means for displacing the arms of each potentiometer a distance from its center tap proportional to the angle $\theta$, means for connecting the arm of the first potentiometer to one conductor of said first pair, means for connecting the arm of the second potentiometer to one conductor of said second pair, means for applying a voltage proportional to $x$ between the center tap of said first potentiometer and the other conductor of said first pair, means for applying a voltage proportional to $y$ between the center tap of said second potentiometer and the other conductor of said second pair, means for adding the difference in voltage between the center tap and the arm of said first potentiometer to a voltage proportional to $x$ and applying the sum across said second potentiometer, and means for adding the difference in voltage between the center tap and the arm of said second potentiometer to a voltage proportional to $y$ and applying the sum across said first potentiometer.

13. Analog computing apparatus comprising, means for receiving a first voltage proportional to a first known quantity, means for receiving a second voltage proportional to a second known quantity, means for receiving an analog quantity representing a third known quantity, a first output conductor, a second output conductor, first averaging means for deriving a third voltage proportional to the average of said first voltage and the voltage of said first output conductor, second averaging means for deriving a fourth voltage proportional to the average of said second voltage and the voltage of said second output conductor, means for deriving a fifth voltage proportional to the product of said third voltage and said analog quantity, means for deriving a sixth voltage proportional to the product of said fourth voltage and said analog quantity, means for adding said first voltage algebraically to said sixth voltage and applying the sum voltage to said first output conductor, and means for adding said second voltage algebraically to said fifth voltage and applying the sum voltage to said second output conductor.

References Cited in the file of this patent
UNITED STATES PATENTS

| | | |
|---|---|---|
| 2,402,359 | Bedford | June 18, 1946 |
| 2,454,549 | Brown et al. | Nov. 23, 1948 |
| 2,543,650 | Walker | Feb. 27, 1951 |
| 2,723,800 | Marner | Nov. 15, 1955 |